Figure 1:
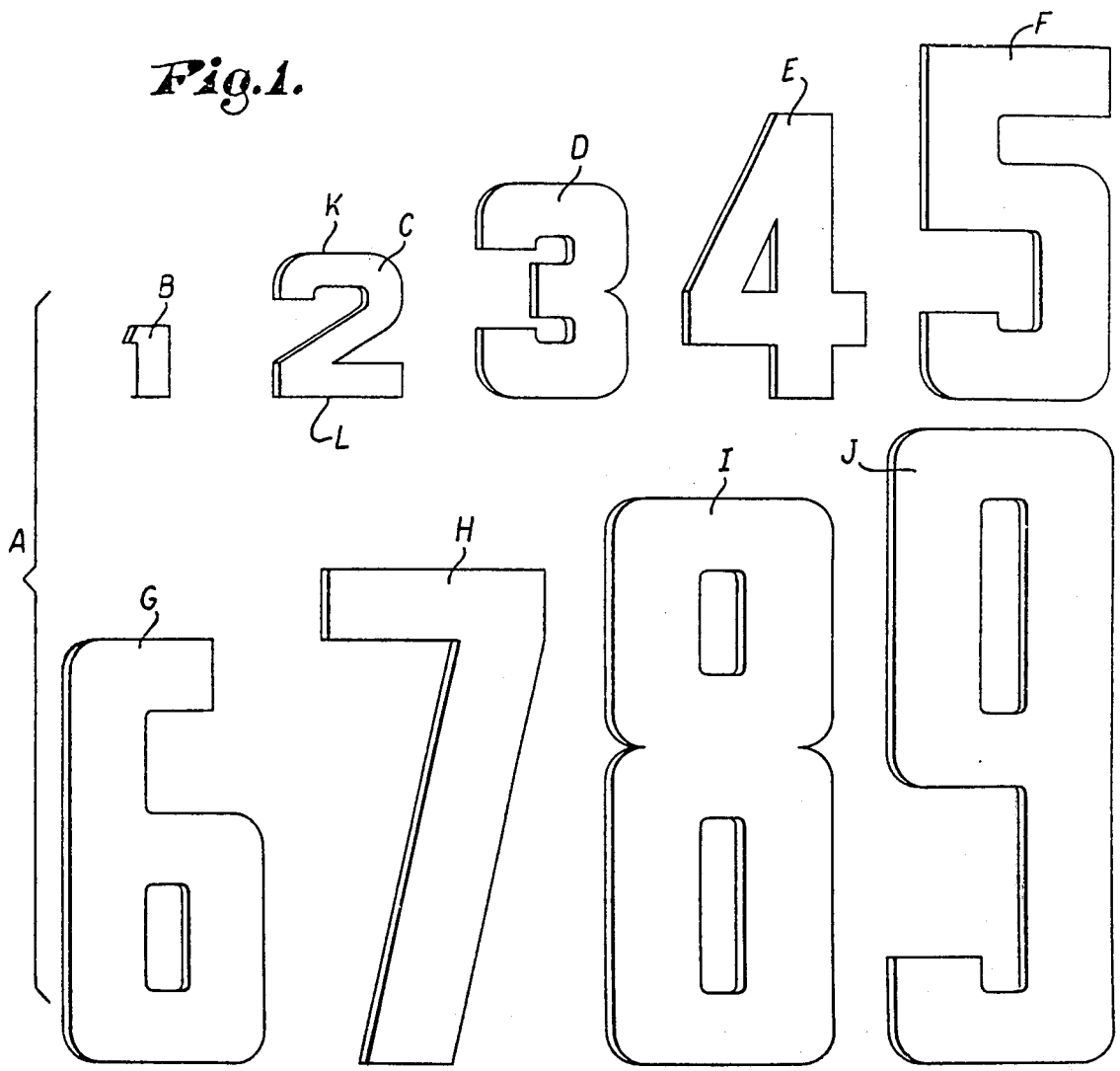

United States Patent [19]
Couvillion

[11] 3,934,357
[45] Jan. 27, 1976

[54] TEACHING METHOD AND APPARATUS

[76] Inventor: Claude C. Couvillion, 3041 E. Lakeshore Drive, Baton Rouge, La. 70808

[22] Filed: Aug. 10, 1973

[21] Appl. No.: 387,350

[52] U.S. Cl. ............................. 35/31 G; 35/70
[51] Int. Cl.² ......................................... G09B 1/02
[58] Field of Search ...... 35/31 R, 31 D, 31 G, 31 F, 35/70

[56] References Cited
UNITED STATES PATENTS

| | | | |
|---|---|---|---|
| 2,494,469 | 1/1950 | Booth | 35/31 D |
| 3,229,388 | 1/1966 | Smith | 35/70 |
| 3,311,997 | 4/1967 | Denny | 35/31 R |
| 3,357,116 | 12/1967 | Bazacos | 35/31 F |

*Primary Examiner*—Wm. H. Greib
*Attorney, Agent, or Firm*—Schmidt, Johnson, Hovey & Williams

[57] ABSTRACT

A method and apparatus for teaching the recognition of basic numerals and performing simple arithmetic steps is provided in which tactile means of learning are utilized in addition to the senses of sight and sound. A series of individual digit-defining cutouts present a range of numerals in which each cutout is of a predetermined length corresponding to its numerical value with the cutouts being graduated to progressively increase in length from a numeral denoting a specific low value to a numeral denoting a specific high value. Thus, when a student selects a group of two or more cutouts and places them in an end-to-end relationship such that their accumulated length is equal to that of another cutout representing a base numeral, it will be seen that the sum of their individual values is equal to that of the base numeral. In this manner, not only is the recognition of individual numerals taught, but also, simple arithmetic addition and subtraction concepts can be taught with the learner discovering the answers to simple arithmetic problems through physical experience. Inasmuch as the cutouts have suitable respective widths and thicknesses compatible with their lengths, the three-dimensional configuration of the numerals makes this teaching method and apparatus ideally suited for use in connection with teaching numerical concepts and simple arithmetic in special education classes, such as those for the mentally handicapped or the blind which kinesthetic means of learning are very important.

5 Claims, 2 Drawing Figures

U.S. Patent  Jan. 27, 1976  3,934,357

TEACHING METHOD AND APPARATUS

This invention relates to a method and apparatus adapted particularly to teach the recognition of basic numerals 1 through 9, and their relative values along with simple addition and subtraction to beginners of preschool, kindergarteners, first-graders, and other grades for remedial math or, to special education students such as those found in classes for the mentally handicapped or the blind.

Among the previously known teaching aids for imparting numeral recognition and their relative values are various arrangements of strips and blocks or the like employed to illustrate or simulate numerical relationships. Certain of these aids, while having components of graduated sizes to indicate the corresponding value of the numerals, do not incorporate relative sizes along with the specific physical configurations which correspond directly to the numerical value of a particular numeral in such a manner that the kinesthetic senses may be utilized in the learning process as well as the other basic senses of sight and sound. It is a well-established fact that kinesthetic means of learning are among the most lasting. In other words, those previously known teaching aids did not provide for the use of the physical appearance and handling of cutout numerals which are in exact proportion to one another to physically demonstrate their corresponding relative values. These are limited to memory means and do not provide for a discovery experience.

It is, therefore, a very important object of my invention to provide a method of teaching numeral recognition and apparatus therefor in which the learning process includes the sense of touch in addition to the senses of sight and sound.

Another very important object of my invention is to provide for the physical handling of the numerals by the student in solving addition and subtraction problems in a manner that the relative values of the numerals are visually and physically discovered and readily recognized by the corresponding lengths of the numerals.

Yet another important object of the invention is to provide a method and apparatus for teaching the relative value of numerals that will positively interest the student and permit him to immediately evaluate the results of his own addition and subtraction performances as he performs the exercises.

A still further object of the invention is to provide a method and apparatus for the teaching of relative numerical values to handicapped persons such as the blind who must supplement their sense of hearing with a well-developed sense of touch or to the deaf who learn by seeing and touching.

Figure 2:
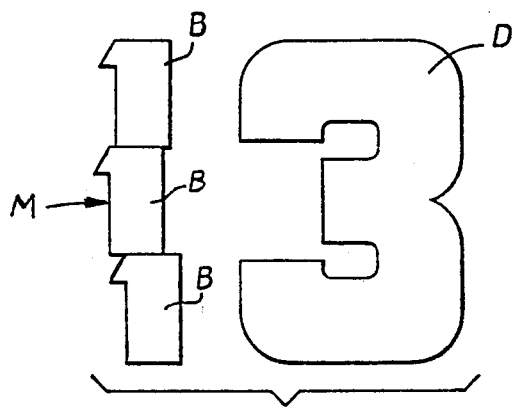

In the drawings:

FIG. 1 is a perspective plan view of a series of three-dimensional, digit-defining cutouts presenting a range of numerals from 1 through 9; and FIG. 2 is a plan view of a group of cutouts having a cumulative length equal to that of a preselected associated base numeral.

An apparatus for teaching numeral recognition and arithmetic is broadly identified by the letter A and comprises a series of individual, digit-defining cutouts B, C, D, E, F, G, H, I and J presenting a range of numerals 1 through 9 respectively.

The individual cutouts B-J are three-dimensional, having suitable respective widths and thicknesses compatible with their predetermined lengths, and may be made of wood, wood fiber, plastic, Masonite, rubber, composition, paper product, metal or other suitable material which is sufficiently durable to withstand repeated handling and is not subject to deformation or breakage during normal use. The thickness of the cutouts B–J should be such that a young child or physically handicapped person might easily pick them up individually from a flat surface such as a table or desk top, it being found that a thickness of approximately 3/16ths of an inch is quite adequate. To further facilitate the ease of handling of the cutouts B–J, the backsides thereof should ideally be of a non-sliding texture in order that once the cutouts have been properly placed during a learning exercise, they are not easily or inadvertently shifted relative to other cutouts which are located proximal thereto.

The length of each cutout or numeral B–J is in exact proportion to the length of the other cutouts making up the series A and corresponds to its relative numerical value; that is, the numeral 1 (B) is of a given length and the numeral 9 (J) is of a length exactly nine times that of the numeral 1 (B). The numerals between 1 (B) and 9 (J) are also graduated in 1/9th increments as indicated by the following table:

The 2 is 2/9 the length of numeral 9
The 3 is 3/9 the length of numeral 9
The 4 is 4/9 the length of numeral 9
The 5 is 5/9 the length of numeral 9
The 6 is 6/9 the length of numeral 9
The 7 is 7/9 the length of numeral 9
The 8 is 8/9 the length of numeral 9

The width of each numeral 1 through 9 (B–J) is understood to be of a suitable dimension to attain a properly balanced image in proportion to its length.

To further illustrate the exact relative lengths, suppose that the numeral 1 (B) is one inch in length, then the numeral 9 would be 9 inches in length with the intervening numerals being proportionately longer or shorter than the numeral 1 (B) or 9 (J) as the case might be. The length may be arbitrarily established to suit the particular needs of the student and may be in terms of "feet", "meters" or the like instead of "inches". In each instance the corresponding ratio would still apply from numeral to numeral.

A basic series of numerals B–J making up the apparatus A would consist of at least 23 cutouts as follows:

9 - 1's
4 - 2's
3 - 3's
2 - 4's
1 each of 5, 6, 7, 8 and 9

The manner in which the apparatus A, with its individual cutout numerals B–J is used, may be considered as consisting of three readily identifiable phases of the instructional method. Initially, a teacher, using the apparatus A, will acquaint a student with the numerals 1 through 9 (B–J respectively) in order that the student is able to readily identify the same after which the student is taught addition and subsequently subtraction as the last phase of the teaching method.

To begin the teaching method, the teacher will display the individual numerals B–J by holding each, in turn, in a manner for the student to readily see the entire numeral and, in so doing, make a special effort to call the student's attention to the differences in the physical lengths of the numerals while explaining the relative arithmetic value of each numeral as it is exhibited. Inasmuch as the numerals are of varying proportionate lengths, the student automatically recognizes that the differences in length corresponds to the differences in value. Such recognition of values is not the case when the conventional flash card or chalkboard with numerals written thereon is used inasmuch as a written numeral which does not convey the relative difference in value through a representation of its physical size is inherently less effective than is a cutout numeral in which the sense of sight or vision is used to supplement the verbal or hearing sense in demonstrating the differences in values of the various numerals.

After the teacher has explained the relative value of each different numeral in the series A, he will be able to physically discover and prove that it takes nine 1's end-to-end to equal the length of the numeral 9 by simply placing the nine 1's either on or adjacent the numeral 9 and thereby physically demonstrate the cumulative value of the nine 1's as being equal to that of the single numeral 9. This cannot be as meaningfully accomplished through the use of flash cards or chalkboards on which the numerals 1 and 9 are normally written in the same sized figures on oversize sheets and cannot be physically aligned to show their relationship. It is at this point that the student is to be given the opportunity to handle each of the cutout numerals B–J and thereby make use of his tactile sense as a part of the learning experience. It is also at this point that the usefulness and value of a three-dimensional cutout can best be appreciated when it is recognized that handicapped individuals, such as the blind, can employ their sense of touch to likewise "observe" the relative differences in the values of the respective numerals as represented by their corresponding differences in lengths. In physically placing the numeral 1 (B) either beside or on the numeral 9 (J), it is immediately recognized by the student that the 1 is much shorter than the 9 and the teacher can then meaningfully explain the relative and precise differences. Likewise, all of the other numerals can be handled by the student for comparison as just outlined with the numerals 1 and 9.

After the student has thoroughly learned the individual numbers and recognizes their relative values either through the combined senses of sight, touch and sound, or through the means of sound and touch only, the individual numerals may be utilized to teach addition and subtraction to beginners. In so doing, the numerals are placed on a flat table or desk top in front of the student and he is asked by the teacher to select any one of the numerals, except the numeral 1 (B), and place it on the table or desk before him. The teacher shall then explain that the numeral he has just selected is to be called the "base numeral" and that the student is now to select a group of at least two of the remaining numerals from the series A and place these in an end-to-end relationship on or adjacent the base numeral such that the combined lengths of the selected group of numerals is equal to the length of the base numeral. To this end, each of the numerals B–J are provided with straight top and bottom edges K and L which are in parallelism with one another in order that the numerals will accurately reflect their true combined lengths when placed in an end-to-end relationship.

For example, as shown in FIG. 2, the student may have selected as his base numeral, the cutout 3 (D) and chosen to place alongside the base numeral 3 (D) a group M of three numerals 1 (B) at which time the teacher then is able to demonstrate to the student that the group of three 1's added together equals the length and, therefore, the value of the base numeral 3 (D). Further, the teacher may then instruct the student to select additional groups of numerals which, when placed into an end-to-end relationship would also equal the value of the base numeral 3 (D); in this case, the student would then check through the remaining numerals and, by trial and error, eventually discover that the numeral 1 (B), placed in an end-to-end relationship with the numeral 2 (C) also equals the length of the numeral 3 (D). In this manner, the teacher may work with the student until all possible combinations of the numerals B–J have been made with respect to the various base numerals chosen.

After the addition arithmetic has been mastered by the student, the instructor may begin the subtraction phase of the teaching method. The student is assigned the task of rearranging a group of numerals equal to a selected base numeral by removing one numeral from the group after which the teacher proceeds to repeat the action himself and, in so doing, explain that the numeral remaining in the group is the remainder or that which remains after the one numeral was removed from the base numeral. In referring back to FIG. 2 and the addition example, it may be easily shown that removal of, in this case, two of the numerals 1 (B) from the group M, as related to the base numeral 3 (D), would equal 1 as represented by the remaining numeral 1 (B). Here again, the procedure of subtracting may be used with all of the possible combinations available through the use of the 9 digits provided as a part of the apparatus or series A.

Inasmuch as the student becomes directly involved in the physical arrangement of the cutouts B–J, his interest is maintained and his motivation promoted because he cannot only see the direct results of the arrangement, but is immediately able to detect whether the answer is correct or not without having to wait for the teacher to check his work as would be necessary when the addition or subtraction is performed by writing the numerals on paper, chalkboard, etc. This unique method not only causes the student to feel that he is the one who has selected the numeral to be placed on or with the base numeral, but he is also the one who has determined that the addition or subtraction of certain numerals placed in end-to-end relationship or removed from such a relationship is, in fact, correct.

The uniqueness and effectiveness of this apparatus A may be particularly appreciated when it is remembered that the relative lengths of the numerals 1(B) – 9 (J), makes it possible to quickly and easily communicate their respective values to those individuals who are blind and therefore must rely on other forms of communication than that of sight. The three-dimensional configurations of the numerals in conjunction with their respective relative lengths corresponding to their relative values, permits the blind to quickly gain an appreciation for the relative values of the particular numerals and, in so doing, quickly and easily learn not only to recognize the shapes of the numerals but to also perform the simple addition-subtraction tasks.

Having thus described the invention, what is claimed as new and desired to be secured by Letters Patent is:

1. Apparatus which includes the provision for utilizing kinesthetic senses to teach arithmetic, said apparatus comprising:

a series of individual, three dimensional, digit-defining cutouts presenting a range of numerals having corresponding distinctive configurations in which each of said cutouts is of a predetermined length relative to that of the other cutouts in said series, said cutouts being graduated to progressively increase in length from a numeral denoting a low value to a numeral denoting a high value, the length of each of said cutouts being proportionate to that of the other cutouts in said series with the respective lengths corresponding directly with the numerical value thereof such that a selected group of two or more of said cutouts have a combined length, when placed in an end-to-end relationship, equal to that of the cutout presenting the numeral having a value equal to the sum of the values of said selected group of cutouts, said cutouts each being provided with top and bottom edges that are straight and in parallelism with each other in order that the accurate placing of said cutouts in said end-to-end relationship is facilitated.

2. A method of teaching arithmetic comprising the steps of:

providing a series of individual, three dimensional, digit-defining cutouts presenting a range of numerals having corresponding distinctive configurations and in which said cutouts are of relative, predetermined, proportionate lengths corresponding to their respective numerical values with each cutout having top and bottom edges that are straight and in parallelism with each other;

identifying by kinesthetic means a numeral of each value in said series of cutouts in such a manner to illustrate the distinctive configuration and the corresponding, relative differences in the value as represented by the relative length of each of the numeral cutouts; and physically placing and aligning various ones of said series of cutouts in an adjacent relationship with their respective top and bottom edges in parallelism with one another to compare the relative differences in configuration and length to demonstrate the corresponding distinctive configurations and relative values of said numerals such that said digits are recognized.

3. A method as set forth in claim 2; selecting a base numeral having a value greater than 1 from among said series of cutouts; and discriminatingly choosing from said cutouts remaining in said series a group of at least two numerals having a combined length equal to that of said base numeral for physical arrangement in an end-to-end abutting relationship proximal said base numeral whereby the sum of the values of said chosen group of numerals is equal to the value of said base numeral.

4. A method as set forth in claim 3; and selecting additional groups of numerals, each of which have an accumulated value equal to that of said base numeral from those cutouts remaining in said series and physically placing them in an end-to-end relationship proximal said base numeral whereby multiple combinations of various numerals are associated with said selected base numeral.

5. A method as set forth in claim 3; and physically removing one of said numerals from said group whereby the value of the remaining numeral represents the remainder relative to said base numeral.

* * * * *